Figure 1:
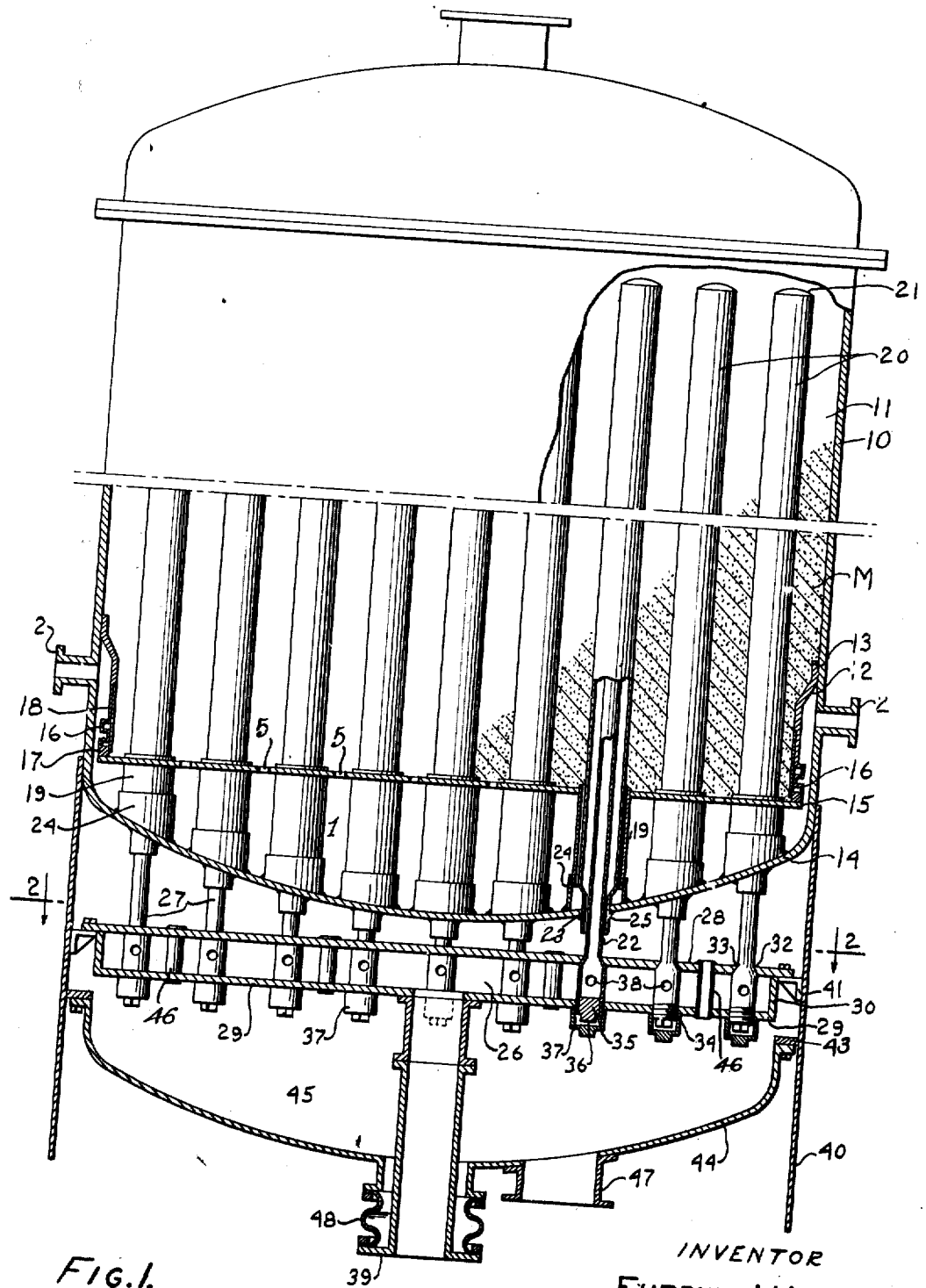

April 21, 1942. E. J. HOUDRY 2,280,089
CATALYTIC CONVERTER AND HEAT EXCHANGE UNIT THEREFOR
Filed June 10, 1938 2 Sheets-Sheet 2

INVENTOR
EUGENE J. HOUDRY

Ira L. Nickerson
ATTORNEY.

Patented Apr. 21, 1942

2,280,089

UNITED STATES PATENT OFFICE 2,280,089

CATALYTIC CONVERTER AND HEAT EXCHANGE UNIT THEREFOR

Eugène J. Houdry, Ardmore, Pa., assignor to Houdry Process Corporation, Wilmington, Del., a corporation of Delaware Application June 10, 1938, Serial No. 212,864

7 Claims. (Cl. 23—288)

This invention relates generally to converters for effecting chemical reactions involving the use of contact materials which may assist or in any way promote the reaction. More particularly it has to do with maintaining the temperatures of the mass in accordance with transitions from one reaction temperature to another and adapting the various converter parts to adjustment according to the temperature changes.

When chemical reactions are carried out in the presence of a contact mass the success of the reaction is to a great degree a matter of proper control of the temperature of the mass which is often effected by the circulation of a heat exchange medium out of direct contact with the mass through tubes disposed therein, preferably equidistant from each other and in parallel relation, for the purpose of uniformly adding heat to the mass or extracting heat therefrom depending upon the particular reaction it is desired to control. As ordinarily constructed the reaction converter comprises a unitary structure including the conversion chamber and heat exchange system and the numerous parts thereof are subject to various strains and shocks due to temperature variations which after periods of use become defective, or deposits may form within the heat exchange tubes which after a time will build up to such an extent as to adversely affect the flow of heat exchange fluid through the converter causing the reaction to take place too fast, too slow or to cease entirely. In the event of any impairment to the converter assembly it is usually necessary to dismantle the same to remove and repair or replace the defective part or parts, and this results in a great loss of time and entails a substantial amount of expense.

Various types of heat exchange media are used for controlling the temperature of a mass. Gaseous fluids have been used effectively but are not so efficient as a fluid which operates in two phases such as mercury, water or diphenyl or materials which are normally solid and operate at high temperatures in a liquid phase such as fused salts and metals of low melting point. In the use of some of these media and particularly those acting in a single phase, any leakage of the medium into the reaction chamber may deleteriously affect the catalyst or disrupt the reaction. In the conversion of low boiling hydrocarbons from hydrocarbons of a higher boiling point where a heat exchange medium which operates in a single phase is used for controlling the temperature of the mass the mingling of the medium with the hydrocarbon vapors in the reaction chamber may under certain operating conditions result in a dangerous explosion.

It is the principal object of the invention to overcome these difficulties and provide a converter and heat exchange assembly permitting freedom of movement of parts under expansion and contraction. Another object is to provide a converter and heat exchange assembly wherein conditions tending adversely to affect a reaction are minimized. A further object is to provide a converter in which repair and replacement of parts is simplified. A still further object is to provide a unitary heat exchange system which may be readily attached to a converter. A more specific object is to provide novel heat exchange manifold and tube connections which permit the ready assembly and removal of tubes. Other objects will become apparent from the detailed description which follows.

In order to illustrate the invention, concrete embodiments thereof are shown in the accompanying drawings, wherein similar parts will be similarly indicated.

Figure 2:
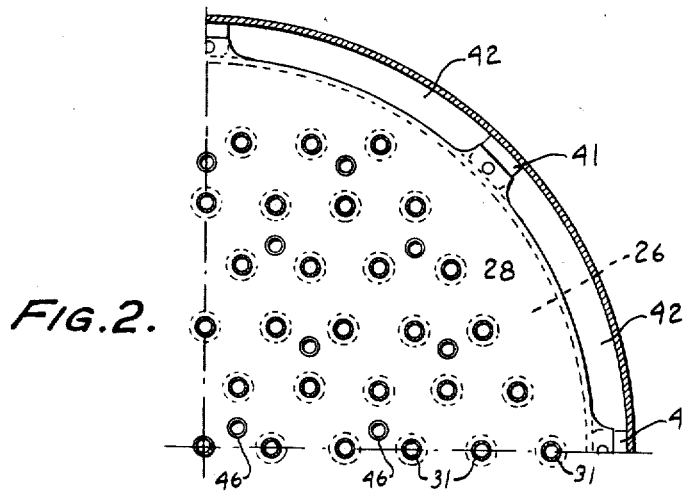
Figure 6:
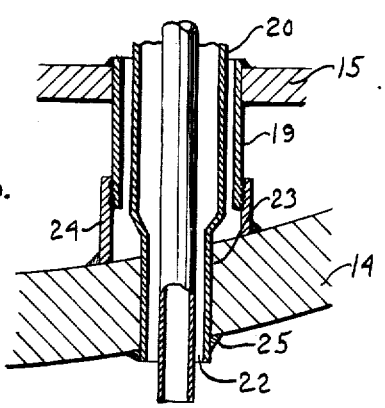

Fig. 1 is a sectional and elevational view partly cut away disclosing the main embodiment of the invention, Fig. 2 is a partial horizontal sectional view on the line 2—2 of Fig. 1, Figs. 3, 4, 5 show modified forms of the tube and manifold assembly, Fig. 6 is a detail of Fig. 1.

In Fig. 1 of the drawings is shown a converter, indicated generally by the numeral 10, embodying the principal features of the invention. A reaction chamber 11 is formed within the converter by means of a skirt 12, suspended from the inner wall and having its upper end 13 securely fixed thereto as by welding. The main portion of the skirt is spaced from the inner wall and terminates a short distance from the end wall 14 of the converter and is provided with a bottom sheet 15 formed integral or suitably fixed thereto and, in order to allow for temperature changes may be split adjacent its lower edge providing an expansion joint 16, which may be fixed to a ring 17 secured to the bottom sheet, and a portion 18 overlying the joint and ring for the purpose of sealing the joint against the entrance of any substance which might interfere with its operation. The reaction chamber 11 may contain a contact mass M of any known material, catalytic or otherwise, capable of producing the desired effect upon a substance brought in contact therewith. For example, it may be mere inert spreading material such as fragments of brick or pieces of fireclay, or it may possess catalytic activity or adsorptive power in large or small degree such as metals or metallic alloys in solid form or impregnated upon carriers, or it may comprise siliceous catalysts including blends of silica and alumina, of natural or artificial origin with or without the addition of other active materials such as metals.

The bottom sheet 15 of the reaction chamber may be perforated as indicated at 5 to permit the passage of reactant fluid or reaction products, if the reaction is a straight through process or it may be provided with apertured distributor and/or outlet or collector tubes if the reaction fluid has a course of parallel flow. Neither of these expedients is shown, since they form no part of the present invention and also for the purpose of clarifying the drawings. The skirt 12 and the bottom wall 15 of the reaction chamber form with the end wall 14 and adjacent side portions of the converter a fluid manifolding chamber 1 having nozzles 2 in communication therewith for directing fluid to the reaction chamber or removing reaction products therefrom. Since the contact material will have substantial weight, provision is made for bracing the bottom sheet 15 of the reaction chamber and one arrangement for doing this is by disposing tubular sleeves 19 in the manifolding chamber at spaced intervals in order to rigidly interconnect the sheet 15 and end wall 14 of the converter.

As shown, the converter 10 is provided with a plurality of heat exchange tubes 20, which may be finned if desired, having closed ends 21, disposed within the contact mass in the reaction chamber and having open ends 22, extending outwardly of the end wall 14 of the converter through suitably spaced apertures 23 and as clearly shown in Fig. 6, the tubes 20 are secured in sealed relation to the reaction chamber by welding to the end wall as at 25. Threaded pipe couplings 24 are in turn fixed as by welding to the interior of the end wall 14 about the apertures 23 and threaded to receive the sleeves 19 which have cooperating threads adjacent their lower ends and are secured at their upper ends to the tube sheet. The bracing sleeves 19 are preferably exteriorly threaded at their lower ends to cooperate with inner threads on the couplings 24 in order that the space between the outer tubes and the sleeves may be sufficiently small to prevent the entrance of any of the mass from the reaction chamber.

The heat exchange unit of the present invention comprises a manifold chamber indicated generally at 26 and a plurality of open end heat exchange tubes 27 secured thereto in cooperative relationship. The manifold chamber will be of such proportions of size and shape as to readily adapt itself to any converter with which it is to be used and preferably is cylindrical and made up of spaced top and bottom walls 28 and 29 respectively and an interconnecting side wall 30 which, as shown, may be formed integral with one of the spaced walls and welded to the other. The heat exchange tubes of the unit are assembled with the manifold in a manner to permit their ready removal for repair or replacement and accordingly the top and bottom walls of the manifold are provided with aligned apertures 31 for receiving an end portion of the tubes. According to the preferred arrangement for assembling the tubes and manifold, as shown in Fig. 1, the apertures in the upper wall will be inwardly tapered to provide abutments 32 while the tube end portions disposed within the manifold chamber will be swaged outwardly to provide shoulders 33 adapted to cooperate with the abutments 32 for providing a substantially fluid tight fit. The tube ends are threaded as at 34 to cooperate with threads in the apertures in the bottom wall for maintaining the tubes fixed and in parallel relation.

In order to assemble or detach the tubes without damaging the same, the swaged ends may be provided with an annular plug 35 which may be associated therewith in a manner to provide a fluid seal and have a portion 36 extending outwardly of the tubes adapted to receive a suitable tool for screwing or unscrewing the tubes into the bottom wall 29 and as a further precaution a cap 37 may be secured to the tube ends. The swaged ends of the tubes are apertured as at 38 to provide communication with the chamber 26, and a heat exchange fluid conduit 39 also communicates with the chamber for admitting fluid thereto. While I have shown only one conduit for delivering fluid to the chamber 26 it is within the scope of the invention to provide a plurality of inlet conduits for simultaneously delivering fluid to different portions of the chamber, for example concentric inlet headers may be disposed below the manifold with branches leading therefrom for supplying fluid to the manifold simultaneously at numerous points. The open end tubes 27 are smaller in diameter than the closed end tubes 20 and are disposed within the larger tubes in nested relation when the heat exchange unit and converter are assembled and are adapted to transmit heat exchange fluid from the manifold 26 to the outer tubes in heat exchange relation with the catalytic mass M for controlling the temperature of the mass.

In order to assemble the heat exchange apparatus, the converter has an extensior or skirt 40 securely fixed to the converter about the end 14 and the heat exchange manifold is attached to the inner wall of the skirt by a plurality of angle brackets 41 (Figs. 1 and 2) providing spaces 42 (Fig. 2) between the manifold 26 and the skirt. Positioned below the manifold and secured in sealing engagement with rib 43 extending from the inner wall of skirt 40 is an arcuate plate 44 (Fig. 1) forming with the end wall 14 of the converter a fluid chamber 45 to which the fluid after circulating through the nested tubes may pass from the outer tubes through the spaces 42 along the periphery of the manifold. The manifold 26 may be provided with stays 46 for strengthening its walls, and they will preferably take the form of hollow tubes to assist in passing the fluid from the outer tubes 20 to the chamber 45. The end plate 44 is provided with a fluid outlet 47 for directing the fluid after passage in heat exchange relationship with the mass to a suitable heat exchanger and pump (not shown) for recirculation. The heat exchange fluid inlet 39 may be provided with an expansion joint 48 to allow for contraction and expansion due to temperature changes.

Figure 3:
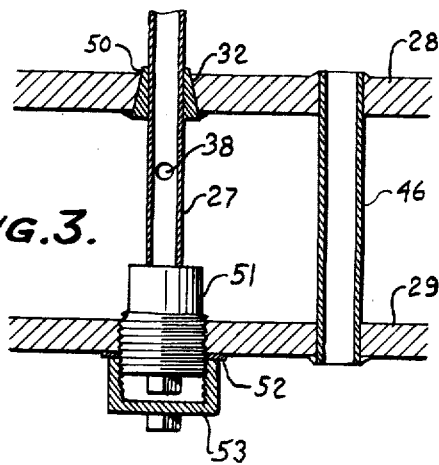
Figure 4:
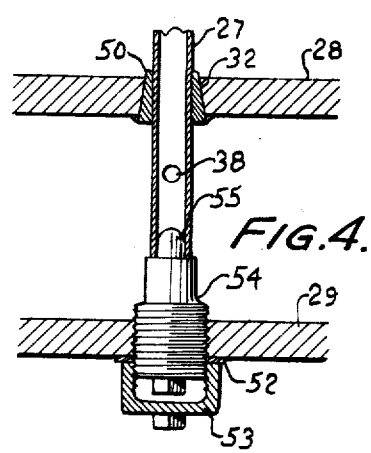

Figs. 3 and 4 show modified arrangements for detachably mounting the heat exchange fluid tubes on the manifold member in which swaging or expanding of the ends of the tubes is not required. In Fig. 3 the apertures in the upper manifold wall are provided with tapering sleeves 50, providing a sliding fit with the tubes 27, and are secured to the wall so as to abut the shoulders 32 of the apertures. Removable plugs 51 are adapted to cooperate with the threaded apertures in the lower manifold wall for adjustably positioning the tubes and in order to seal the lower manifold wall washers 52 are retained about its apertures by means of caps 53 secured to the plugs 51. In Fig. 4 the removable plug 54 is provided with a guide 55 for centering and fixing the position of the end of the tube during and after assembly. A stop (not shown) may be provided if desired to limit the extent of projection of the tube through sleeve 50. According to these modified arrangements in the event of a defective tube the plugs are detached from the lower wall and the tubes may be readily removed by inserting a suitable tool in the apertures 38.

Figure 5:
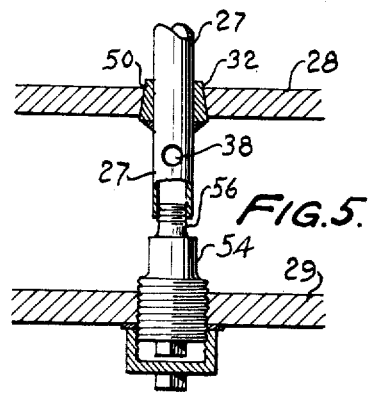

In Fig. 5 is shown an alternative arrangement for assembling the tubes with the manifold which combines the ideas embodied in Figs. 1, 3 and 4. The sleeves 50 in this modification are fixed to the tubes 27 and the guide 56 on the removable plug 54 is threaded to receive the ends of the tubes. In assembling the tubes and manifold, the plugs may be first secured to the ends of the tubes and the tubes then inserted through the apertures of the bottom plate which will be sufficiently large to admit the sleeves 50 and if removal is necessary the assembled tube and plug can be removed together.

The foregoing description of the illustrative embodiments is not intended as defining the limits of the invention and it will be understood that the invention may be variously modified within the scope of the appended claims.

I claim as my invention:

1. Apparatus for carrying out reactions comprising a converter casing having side and end walls providing a chamber, a partition positioned within the chamber forming a reaction chamber and fluid manifolding chamber, a plurality of tubes in said reaction chamber each having an open end extending through the partition and one end wall and closed ends within the reaction chamber, said open ends being secured to said end wall, in combination with a heat exchange unit including a fluid manifold positioned exteriorly of said end wall having opposed upper and lower walls, apertures having inwardly diverging sides in the upper wall of said manifold and a plurality of tubes each having an end extending through said apertures in communication with said manifold and the other end positioned within the first mentioned tubes, bearing surfaces on the tubes for cooperating with the diverging sides of the apertures and means in the other wall of said manifold for placing the bearing surfaces under compression.

2. Apparatus for carrying out reactions comprising a casing having side and end walls, an apertured partition positioned within the casing forming a reaction chamber and fluid manifolding chamber therefor, a plurality of tubes each having a closed end in said reaction chamber and and open end secured to and communicating through one end wall, in combination with a heat exchange unit including a fluid manifold positioned exteriorly of said one end wall, said manifold having opposed upper and lower walls, apertures having inwardly diverging sides in one manifold wall, and a plurality of tubes having one end extending through said apertures in communication with said manifold and the other end positioned within said first mentioned tubes, bearing surfaces on the tubes cooperating with the diverging sides of the apertures and means in the other manifold wall for placing the bearing surfaces under compression.

3. An upright converter comprising top and bottom end walls and an interconnecting side wall forming a main chamber, a transverse wall having a plurality of apertures therein positioned within the chamber in spaced relation with the side wall and in spaced relation with said bottom end wall, said bottom end wall having a plurality of apertures therein aligned with the apertures in said transverse wall, a plurality of closed end tubes extending through the apertures in the transverse wall each having its open end secured in and communicating through the aligned apertures in the bottom end wall and its closed end disposed below the upper end wall, means on said bottom end wall extending upwardly for supporting said transverse wall in fixed position, a skirt having its upper edge secured to the converter side wall and its lower edge secured to said transverse wall for dividing the main chamber into an upper reaction chamber for containing contact material and a manifold below the reaction chamber, other apertures in said transverse wall providing communication between said reaction chamber and said reactant manifold, a depending side wall secured to the reaction chamber side wall, a heat exchange fluid manifold having opposed upper and lower walls secured to said depending side wall in spaced relation with the converter bottom end wall forming with said bottom end wall, a second heat exchange fluid manifold which is in communication with the open ends of said closed end tubes, a plurality of open end tubes each having one open end secured to and communicating through the upper wall of the first mentioned heat exchange fluid manifold and its other open end positioned in the closed end tubes, and means for supplying fluid to one of the heat exchange manifolds for passage in reverse flow through the tubes to the other heat exchange fluid manifold.

4. A heat exchange unit comprising a fluid manifolding chamber including opposed upper and lower walls, apertures having inwardly diverging sides in the upper wall and a plurality of heat exchange tubes each having an end extending into the chamber through said apertures, apertures in the tubes adjacent the ends permitting communication with said chamber and bearing surfaces on the tubes for cooperating with the diverging sides of the apertures, removable plugs extending through the other wall substantially in line with and abutting the tube ends to place the bearing surface under compression.

5. A heat exchange unit comprising a fluid manifolding chamber including opposed upper and lower walls, a plurality of heat exchange tubes each having an open end extending into the chamber through apertures in the upper wall, said apertures having inwardly diverging sides, apertures in the tubes adjacent the ends permitting communication with the chamber, bearing surfaces on the tubes for cooperating with the diverging sides of the apertures, removable plugs extending through the other chamber wall in alignment with said tube ends, said plugs being positioned to abut the tube ends to place the bearing surfaces in compression with the sides of the apertures, and means on said plugs for maintaining the tubes in position.

6. A heat exchange unit comprising a fluid manifolding chamber including upper and lower walls, a plurality of heat exchange tubes extending into said chamber through apertures in the upper walls, said apertures having inwardly diverging sides, apertures in the tubes adjacent the ends permitting communication with the fluid chamber, bearing surfaces on the tubes for cooperating with the inwardly diverging sides of the apertures, removable plugs extending through the other manifold wall into the chamber, said plugs and said tube ends having cooperating screw threads thereon to maintain the tubes in fixed position and to place the bearing surfaces in compression.

7. A heat exchange unit comprising a fluid manifolding chamber having opposed upper and lower walls, apertures having inwardly diverging sides in the upper wall and a plurality of heat exchange tubes each having an end extending through said apertures into the chamber, apertures in the tubes adjacent the ends permitting communication with said chamber, bearing surfaces on the tubes for cooperating with the diverging sides of the apertures and screw means in the other wall and placing the bearing surfaces in compression.

EUGENE J. HOUDRY.